(12) United States Patent
King et al.

(10) Patent No.: US 10,836,020 B2
(45) Date of Patent: Nov. 17, 2020

(54) TILT COMPENSATED TORQUE-ANGLE WRENCH

(71) Applicant: Snap-on Incorporated, Kenosha, WI (US)

(72) Inventors: Jerry A. King, Hacienda Heights, CA (US); Nathan J. Lee, Escondido, CA (US)

(73) Assignee: Snap-on Incorporated, Kenosha (*) Notice: Subject to any disclaimer, the term of this patent is extended or adjusted under 35 U.S.C. 154(b) by 0 days.

(21) Appl. No.: 16/178,315

(22) Filed: Nov. 1, 2018

(65) Prior Publication Data

US 2020/0139524 A1 May 7, 2020

(51) Int. Cl.
| | | |
|---|---|---|
| *B25G 1/06* | (2006.01) | |
| *G01L 5/24* | (2006.01) | |
| *B25B 23/142* | (2006.01) | |
| *B25B 13/48* | (2006.01) | |
| *B25B 23/00* | (2006.01) | |

(52) U.S. Cl.
CPC ........ *B25B 23/1425* (2013.01); *B25B 13/481* (2013.01); *B25B 23/0028* (2013.01); *B25B 23/0035* (2013.01); *B25G 1/066* (2013.01); *G01L 5/24* (2013.01)

(58) Field of Classification Search
CPC .............. B25B 13/461; B25B 23/0028; B25B 23/0021; B25B 23/1425; B25B 13/463; B25G 1/066; B25G 1/063; B25G 1/043; B25G 1/085
See application file for complete search history.

(56) References Cited

U.S. PATENT DOCUMENTS

| | | | |
|---|---|---|---|
| 6,968,759 B2* | 11/2005 | Becker ................ | B25B 23/1425 |
| | | | 73/862.23 |
| 7,832,286 B2 | 11/2010 | Nakagawa et al. | |
| 7,878,091 B2* | 2/2011 | Abel ..................... | B25B 13/461 |
| | | | 81/177.9 |
| 8,327,741 B2 | 12/2012 | Hsieh | |
| 8,806,993 B2 | 8/2014 | Coffiand | |
| 9,156,148 B2* | 10/2015 | King ................... | B25B 23/1425 |
| 9,855,643 B2 | 1/2018 | Coffiand | |
| 2006/0225519 A1 | 10/2006 | Nakagawa et al. | |
| 2007/0144270 A1* | 6/2007 | Crass .................. | B25B 23/1425 |
| | | | 73/862.21 |

(Continued)

FOREIGN PATENT DOCUMENTS

| | | |
|---|---|---|
| CN | 201833325 U | 5/2011 |
| DE | 102008055581 | 6/2010 |

(Continued)

OTHER PUBLICATIONS

Combined Search and Examination Report for Application No. GB1912268.8 dated Feb. 13, 2020, 7 pages.

*Primary Examiner* — Brandi N Hopkins
(74) *Attorney, Agent, or Firm* — Seyfarth Shaw LLP

(57) ABSTRACT

A method of determining an actual amount of torque and/or angle applied to a work piece by a tool. In an embodiment, the method includes determining a rotational angle, a tilt of the tool, and a measured torque of the tool. The actual amount of torque or angle applied to the work piece is then determined based on the rotational angle, the tilt, and the measured torque.

11 Claims, 3 Drawing Sheets

(56) References Cited

U.S. PATENT DOCUMENTS

2011/0185863 A1* 8/2011 Hsieh .................... B25B 23/142
  81/479
2017/0232593 A1    8/2017 Coffland
2017/0348836 A1   12/2017 Hu

FOREIGN PATENT DOCUMENTS

| JP | 2011161582 A | 8/2011 |
| JP | 2012086284 A | 5/2012 |
| JP | 2012236264 A | 12/2012 |
| JP | 2013188858 A | 9/2013 |

\* cited by examiner

WHERE:
  Z = MEASURED Z AXIS RATE
  X = MEASURED X AXIS RATE
  θ = TILT ANGLE
  Z' = TILT COMPENSATED RATE

TILT COMPENSATED TORQUE-ANGLE WRENCH

TECHNICAL FIELD OF THE INVENTION

The present invention relates generally to handheld tools, such as torque wrenches. More particularly, the present invention relates to flex angle compensation for turn angle and torque measurement accuracy.

BACKGROUND OF THE INVENTION

Handheld tools such as torque wrenches are used to access and apply torque to fasteners. Some torque wrenches include flex heads that allow the wrench body to pivot and clear components that would hinder the use of the torque wrench. However, flexing of the torque wrench's head causes errors in torque and angle measurements. This is because when the head is flexed, the wrench body and the sensor are turning in different planes than the fastener.

SUMMARY OF THE INVENTION

The present invention broadly comprises a method of determining an actual fastener torque and angle provided by a tool. In an embodiment, the method includes determining a rotational angle, a tilt of the tool, and a measured torque of the tool. The actual fastener torque or angle is then determined based on the rotational angle, the tilt, and the measured torque.

In an embodiment, the present invention broadly comprises a method of operation of a tool that includes one or more sensors. At least one sensor measures angular rates of rotation over both a yaw axis and a roll axis simultaneously. The method includes determining, for example, by a processor/controller of the tool, a rotational angle and tilt of the tool using the angular rates of rotation. Another sensor measures a torque of the tool, and the method further includes determining an actual fastener torque based on the rotational angle, the tilt, and the measured torque.

In an embodiment, the present invention broadly comprises a method of determining an adjusted or actual torque of a tool. The method includes determining a measured torque of the tool. The method also includes determining a tilt of the tool. The method further includes adjusting the measured torque by an adjustment factor. The adjustment factor includes a ratio of a tool length to a reaction distance based on the determined tilt.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
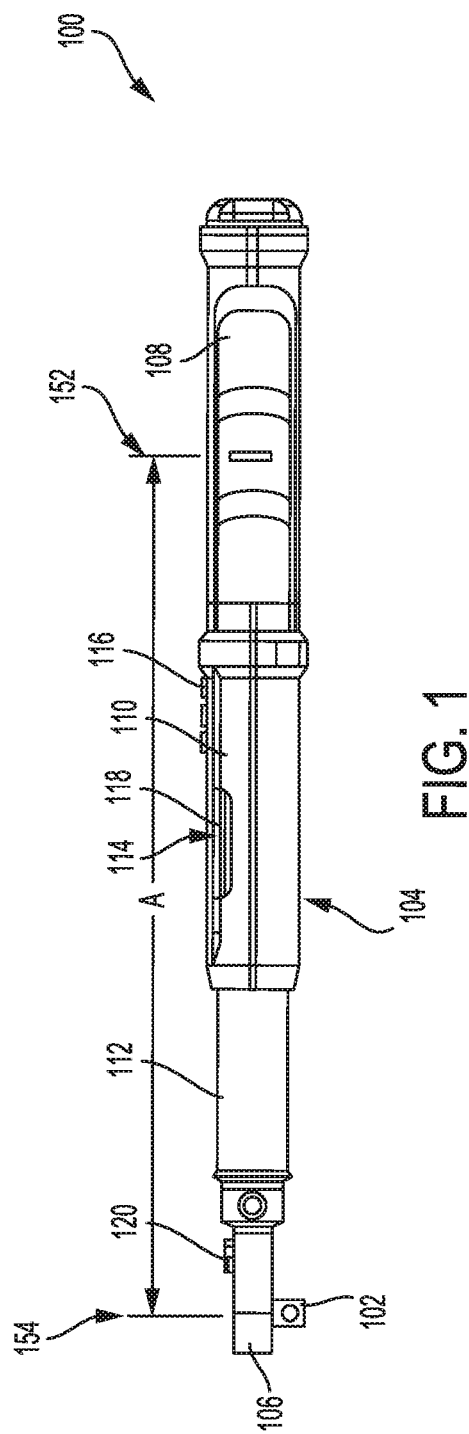
FIG. 1 is a side view of a tool, such as a torque wrench, in an unflexed position.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention relates to a method of determining a fastener torque and/or angle provided by a wrench. In an embodiment, the method broadly comprises determining a rotational angle, a tilt, and measuring a torque applied by the wrench. However, the measured torque may be inaccurate due to flexing of a head of the wrench. In this case, an adjusted or actual applied fastener torque is determined based on the rotational angle, the tilt, and the measured torque.

Figure 2:
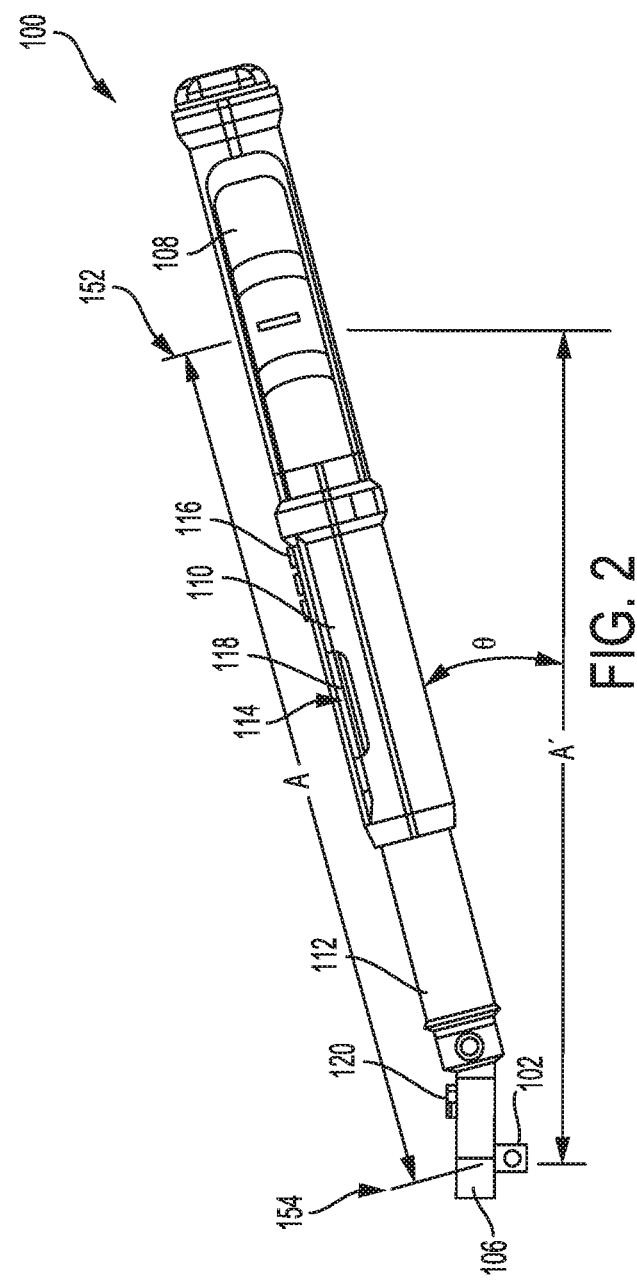
FIG. 2 is a side view of the tool of FIG. 1 in a flexed position.

Referring to FIGS. 1 and 2 a wrench 100, a torque wrench that is adapted to apply torque to a work piece via an adapter or socket coupled to a drive 102, such as a bi-directional ratcheting square or hexagonal drive, is shown. Conventionally, the drive 102 is a "male" rectangular lug designed to matingly engage a female counterpart (as illustrated), but the drive may be any cross-sectional shape adapted to matingly engage a female counterpart, or the drive may include "female" connector designed to matingly receive a male counterpart. The drive may also be structured to directly engage a work piece without coupling to an adapter or socket.

As will be described in further detail below, in an embodiment, the wrench 100 determines an adjusted or actual applied fastener torque provided by the wrench. For example, the method includes determining a rotational angle and tilt of the wrench, and a measured amount of torque applied by the wrench 100 to the work piece. The adjusted or actual applied fastener torque is determined taking into consideration the rotational angle, the tilt, and the measured amount of torque applied by the wrench 100 to the work piece. The measured amount of torque applied by the wrench 100, angle, and tilt data may be logged and stored with a time index by the wrench 100 and/or an external device in communication with the wrench 100.

The torque wrench 100 broadly comprises a shaft 104 connected to a head 106 housing a drive 102. When ratcheting and torqueing, the head 106 rotates around a center axis of the drive 102. The shaft 104 comprises a handle 108, a control unit 110, and a neck 112. In an embodiment, the neck 112 is coupled to the head 106 at the opposite end of the shaft 104 from the handle 108, and is a flex head. The flex head is capable of being flexed or tilted with respect to the handle 108 to allow easier engagement with a work piece that is located in an area that is difficult to access with a regular torque application tool. As illustrated, the male drive 102 extends perpendicularly from the head 106, relative to the plane in which the head 106 rotates around the center axis of the drive 102. Force is applied to the handle 108 to rotationally pivot the wrench 100 around the center axis of the drive 102, thereby transferring torque to a work piece (not illustrated) engaged with the drive 102.

The handle 108 may include a textured grip to improve a user's grasp of the wrench 100 during torqueing operations. The control unit 110 may include a user interface 114, such as a tactile user interface comprising at least one button 116 and a display screen 118. The display screen 118 may optionally be touch-sensitive, with the software or firmware executed by a processor or controller of the control unit 110 providing virtual on-screen controls.

Instructions and other information can be input directly into the wrench 100 via the user interface 114. During torqueing operations, the display 118 may display information, such as torque, tilt, and/or angle information. The head 106 may include a reversing lever 120 for reversing the drive direction (aka torque application direction) of a ratcheting mechanism. As will be discussed further below, the head 106 also houses one or more sensors used to measure the amount of torque applied to a work piece via the drive 102, the angle of rotation of the head 106 and shaft 104 around the center axis of the drive 102. The head 106 also includes an orientation sensor, such as, for example, an accelerometer, to determine the angle of the axis relative to "down" (that is, relative to the force of gravity). The orientation sensor may also be used to determine if the wrench 100 has moved, to automatically wake the wrench 100 up from low power sleep mode and/or detect if the wrench 100 has been dropped and may need recalibration.

Figure 3:
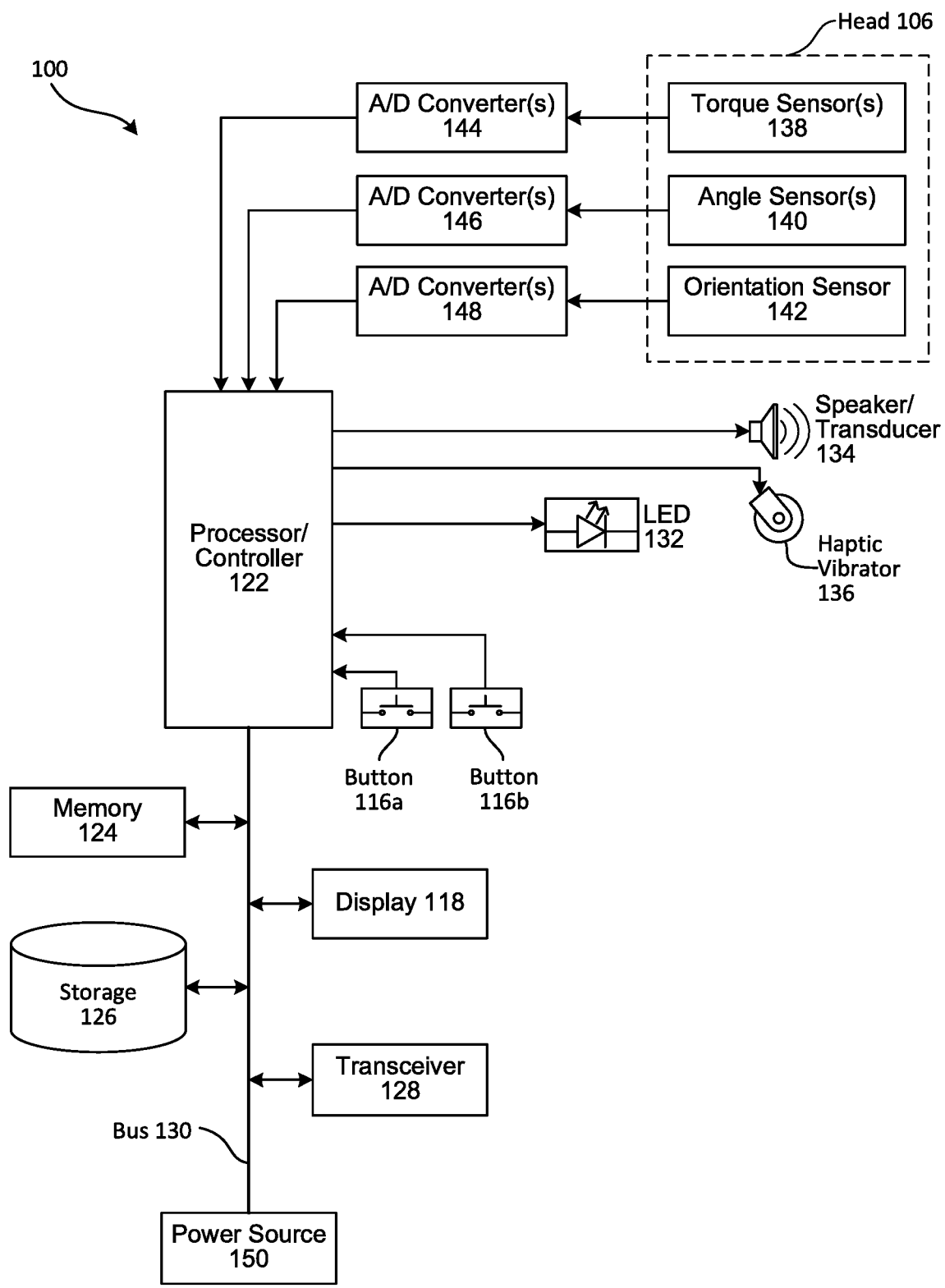
FIG. 3 is a block diagram conceptually illustrating example electronic components of the torque wrench of FIG. 1.
Figure 4:
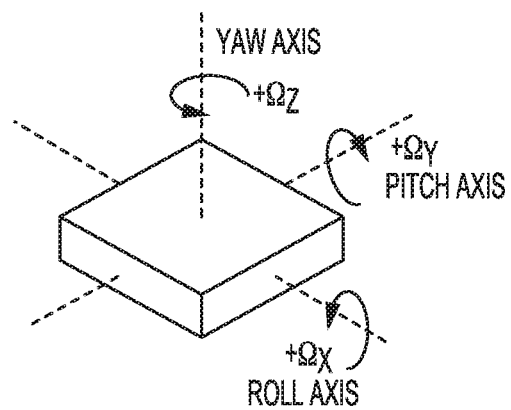
FIG. 4 is a diagram of the yaw axis, the roll axis, and the pitch axis for rotation of a tool, such as a torque wrench.

FIG. 3 is a block diagram conceptually illustrating examples of the electronic components of the wrench 100 of FIG. 1. The wrench 100 may include one or more controllers/processors 122, a memory 124, non-volatile storage 126, and a wireless communications transceiver 128. Each controller/processor 122 may include a central processing unit (CPU) for processing data and computer-readable instructions. The processor/controller 122 retrieves instructions from data storage 126 via a bus 130, using the memory 124 for runtime temporary storage of instructions and data. The memory 124 may include volatile and/or nonvolatile random access memory (RAM). While components are illustrated in FIG. 3 as being connected via the bus 130, components may also be connected to other components in addition to (or instead of) being connected to other components via the bus 130.

Data storage 126 may include one-or-more types of non-volatile solid-state storage, such as flash memory, read-only memory (ROM), magnetoresistive RAM (MRAM), phase-change memory, etc. The wrench 100 may also include an input/output interface to connect to removable or external non-volatile memory and/or storage (such as a removable memory card, memory key drive, networked storage, etc.). Such an input/output interface may be a wired or embedded interface (not illustrated) and/or may comprise the wireless communications transceiver 128.

Computer instructions for operating the wrench 100 and its various components may be executed by the controller/processor 122, using the memory 124 as temporary "working" storage at runtime. The computer instructions may be stored in a non-transitory manner in non-volatile memory 124, storage 126, or an external device. Alternatively, some-or-all of the executable instructions may be embedded in hardware or firmware in addition to or instead of software.

The wrench 100 may include multiple input and output interfaces. These interfaces include the transceiver 128, one-or-more buttons 116a/116b, one-or-more light-emitting diodes LEDs) 132, a speaker or audio transducer 134, a haptics vibrator 136, one-or-more torque sensors 138, one-or-more angle sensors 140, and an orientation sensor 142 that in communication with the processor/controller 122. The torque sensor 138 may include, for example, one-or-more of a torque transducer, a strain gauge, a magnetoelastic torque sensor, and a surface acoustic wave (SAW) sensor. The angle sensors 140 may comprise, for example, a rotational angle sensor or gyroscope (such as a 3-D MEMS gyroscope). The orientation sensor 142 may comprise, for example, an accelerometer and sense motion.

Depending upon the type of torque sensor 138 used, analog-to-digital (A/D) converters 144 may receive analog signals from the torque sensor 138, outputting digital signals to the processor/controller 122. Likewise, A/D converters 146 may receive analog signals from the angle sensor 140, and A/D converters 148 may receive analog signals from the orientation sensor 142, outputting digital signals to the processor/controller 122. The A/D converters may be discrete, integrated with/in the processor/controller 122, or integrated with/in their respective sensors.

The number of, and need for, the A/D converters is dependent on the technology used for each sensor. Multiple A/D converters may be provided to accommodate as many signals as needed, such as if the angle sensor 140 provides analog outputs for a plurality of gyroscope axes. Signal conditioning electronics (not illustrated) may also be included as standalone circuitry, integrated with/in the processor/controller 122, or integrated with/in the respective sensors, to convert non-linear outputs generated by a component of a sensor into a linear signal.

Instructions executed by the processor/controller 122 receive data output from the sensors, such as torque, tilt, and angle values and measurements. From that data, the processor/controller 122 may determine various information, such as the adjusted or actual torque applied by the wrench 100, a duration that torque has been or should be applied to a work piece, etc.

The sensor data and information can be logged in real time or at a predetermined sampling rate and stored in a memory 124 and/or storage 126. The sensor data and information may also be transmitted to an external device via the transceiver 128 for further analysis and review.

"Data" includes values that are processed to make them meaningful or useful "information." However, as used herein, the terms data and information should be interpreted to be interchangeable, with data including information and information including data. For example, where data is stored, transmitted, received, or output, that may include data, information, or a combination thereof.

The wrench 100 also includes a power source 150 to power the processor/controller 122, the bus 130, and other electronic components. For example, the power source 150 may be one-or-more batteries arranged in the handle 108. However, the power source 150 is not limited to batteries, and other technologies may be used such as fuel cells. The wrench 100 may also include components to recharge the power source 150, such as organic or polymer photovoltaic cells, and/or an interface by which to receive an external charge, such as a Universal Serial Bus (USB) port or an inductive pick-up, along with associated charging-control electronics.

The display 118 may be used by software/firmware executed by the processor/controller 122 to display information for the user/technician to view and interpret. Such information may be formatted as text, graphics, or a combination thereof. The display 118 may also be used to provide feedback when information is entered into wrench 100 (for example, via the buttons 116 and/or a touch-sensitive interface integrated with the display 118 itself). The display 118 may be a liquid crystal display (LCD) display, an organic light emitting diode (OLED) display, an electronic paper display, or any kind of black-and-white or color display that has suitable power-consumption requirements and volume to facilitate integration into the control unit 110.

Referring to FIGS. 1-4, as described above, the torque wrench 100 employs a 3-D MEMS gyroscope to measure angle and tilt information when the head 106 is tilted by an angle with respect to the shaft 104. For example, rotational angle is measured and may be determined by the processor/controller 122 or 3-D MEMS gyroscope by integrating an angular rate of rotation (e.g., angular velocity) over time for the yaw axis (e.g., Z-axis) and the roll axis (e.g., X-axis). The yaw axis measures the rotation of the wrench 100 and the roll axis measures the tilt while the wrench 100 rotates.

An angle of rotation on the yaw axis (e.g., in degrees) may be represented by:

$$\varphi_z = ACF \cdot \int_{t0}^{t'} (\Omega_z - \Omega_0) dt \quad (\text{Eq. 1})$$

Where
$\Omega_z$=angular velocity on the Z axis, in deg/sec
$\Omega_0$=angular velocity reading at rest, in deg/sec
ACF=angle calibration factor
$\varphi_z$=angle of rotation on the Z axis, in deg The ACF is determined, for example, by the processor/controller 122, based on an output by angle sensor 140 while the wrench 100 is rotating only on the yaw plane, minus the output at zero rotation, through a fixed 180 degrees and determining a difference between a measured angle and an actual angle.

Figure 5:
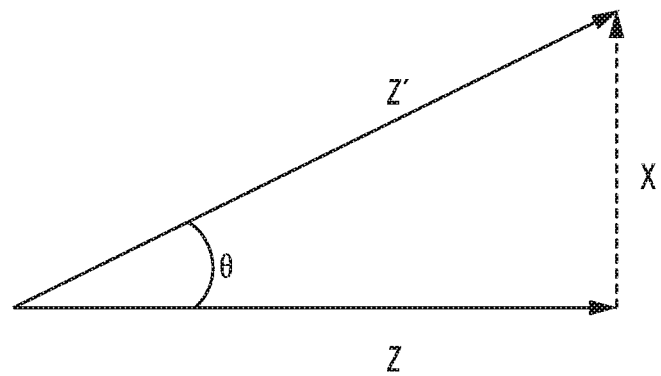
FIG. 5 is a diagram illustrating the relationship between a tilt angle, a measured roll axis rate, a measured yaw axis rate, and a compensated tilt rate.

Referring to FIG. 5, a relationship between a yaw axis rate (Z), a roll axis rate, a compensated tilt rate (Z'), and a tilt angle (θ) is illustrated. For example, if the wrench 100 deviates from the yaw plane due to the tilt of the head 106 (X), the rate (Z) is less than the actual rate (Z'), which is proportional to the angle of tilt (θ). The angle of tilt is determined, for example by the processor/controller 122, based on angle sensor 140 output rates in the yaw axis and the roll axis.

Using relationships between Z, X, Z', and θ, the following equations are derived:

$$Z = Z' * \cos\theta \quad (\text{Eq. 2})$$

$$X = Z' * \sin\theta \quad (\text{Eq. 3})$$

$$Z' = \frac{z}{\cos\theta} \quad (\text{Eq. 4})$$

$$Z' = \frac{x}{\sin\theta} \quad (\text{Eq. 5})$$

$$\frac{z}{\cos\theta} = \frac{X}{\sin\theta} \quad (\text{Eq. 6})$$

$$\frac{\sin\theta}{\cos\theta} = \frac{X}{Z} \quad (\text{Eq. 7})$$

$$\tan\theta = \frac{\sin\theta}{\cos\theta} \quad (\text{Eq. 8})$$

$$\tan\theta = \frac{X}{Z} \quad (\text{Eq. 9})$$

$$\theta = \tan^{-1}\left(\frac{X}{Z}\right) \quad (\text{Eq. 10})$$

-continued

Substitute eq 10 into eq 4

$$Z' = \frac{z}{\cos\left(\tan^{-1}\left(\frac{X}{Z}\right)\right)} \quad (\text{Eq. 11})$$

$$\cos\left(\tan^{-1}\left(\frac{X}{Z}\right)\right) = \frac{1}{\sqrt{1 + \left(\frac{X}{Z}\right)^2}} \quad (\text{Eq. 12})$$

$$Z' = \frac{Z}{\frac{1}{\sqrt{1 + \left(\frac{X}{Z}\right)^2}}} \quad (\text{Eq. 13})$$

$$\boxed{Z' = Z * \sqrt{1 + \left(\frac{X}{Z}\right)^2}} \quad (\text{Eq. 14})$$

Where:
Z'=tilt compensated angle
Z=integrated Z axis rate
X=integrated X axis rate Referring back to FIGS. 1-3, in operation, the wrench 100 applies torque to a work piece, such as a fastener. In general, when the wrench 100 is calibrated, it has a defined calibration length. The calibration length (A) is the distance from a reaction point 152 to the center 154 of drive 102 when the head 106 is not tilted or pivoted with respect to the shaft 104 of the wrench 100. Tilting the head 106 of the wrench 100 results in a change to the length (A) from the reaction point 152 to the center 154 of drive 102 (illustrated as a second or tilted length A'). For example, the wrench 100 may be tilted by an angle (θ).

When the head 106 of the wrench 100 is tilted, the distance from the reaction point 152 to the center 154 of drive 102 decreases (illustrated as A'). This causes a measured amount of torque applied by the wrench 100 to be different than, in particular more than, the actual amount of torque applied to the work piece (e.g., actual applied torque) by the wrench 100. Therefore, to correctly determine and display the actual amount of torque applied to the work piece, the wrench 100 adjusts the output of the sensors, for example using processor/controller 122 and output from one or more of the sensors, as follows:

$$\text{Fastener torque} = \text{Wrench torque} * \frac{A'}{A} \quad (\text{Eq. 15})$$

Where
Fastener torque=Actual torque applied to fastener
Wrench torque=Torque measured by the wrench
A=Wrench length dimension stored in the wrench (reaction point to center of fastener)
A'=Actual reaction distance $$\text{Applying equation: } Z' = Z * \sqrt{1 + \left(\frac{X}{Z}\right)^2} \quad (\text{Eq. 14})$$

$$A = A' * \sqrt{1 + \left(\frac{X}{Z}\right)^2} \quad (\text{Eq. 16})$$

-continued $$A' = \frac{A}{\sqrt{1+\left(\frac{X}{Z}\right)^2}} \quad \text{(Eq. 17)}$$

Substitute eq 17 into eq 15

$$\text{Fastener torque} = \text{Wrench torque} * \frac{A}{\frac{A}{\sqrt{1+\left(\frac{X}{Z}\right)^2}}} \quad \text{(Eq. 18)}$$

$$\text{Fastener torque} = \text{Wrench torque} * \frac{1}{\sqrt{1+\left(\frac{X}{Z}\right)^2}} \quad \text{(Eq. 19)}$$

$$\boxed{\text{Fastener torque} = \frac{\text{Wrench torque}}{\sqrt{1+\left(\frac{X}{Z}\right)^2}}} \quad \text{(Eq. 20)}$$

The use of flex heads introduces errors in torque and turn/rotation angle measurements. For example, these errors may be 3-4% of the reading at a 15 degree flex angle (i.e., the head 106 is tilted about 15 degrees with respect to the shaft 104). An advantage of the wrench 100 is that it uses the output of the gyroscope to determine the flex angle. When the wrench 100 is not flexed and the wrench 100 is turned, only the yaw axis of the gyroscope will produce a reading. This yaw axis reading is calibrated to equate with the angle of rotation of the fastener, which may be an important tightening factor to many fasteners. When the shaft 104 of the wrench 100 is tilted/flexed relative to the head 106 or fastener turning plane, the yaw axis gyroscope reading reduces and the roll axis of the gyroscope detects movement. The combination of these two axes creates the determination for the angle of flex. This angle determination is applied to the torque and angle equations/formulas, for example using the processor/controller 122, above to produce compensated values based on the output of one or more of the sensors, thus compensating for these inherent inaccuracies.

An additional advantage is that the flex angle is not needed to be known beforehand, because it is measured by the gyroscope while the wrench 100 is in operation. For example, the described invention uses all three axes of the gyroscope to measure the actual wrench flex angle during the torque application operation. This is beneficial over using a conventional gravity sensor or accelerometer, which is limited to deviations from the horizontal plane, which cannot directly determine the flex angle of the wrench. The wrench 100 (via the one or more sensors and/or processor/controller 122) determines the actual flex angle by integrating readings from two of the three axes of a digital gyroscope simultaneously. This result yields the actual flex angle. The actual flex angle may be used to compensate for inaccurateness in the rotation angle during torquing of the work piece. These rotation angle inaccuracies are present because the shaft 104 of the wrench 100 is turning in a plane different than the head 106 or fastener.

Furthermore, the wrench 100 (via the one or more sensors and/or processor/controller 122) compensates for toque inaccuracies resulting from the use of a flex head. When the head 106 is flexed relative to the shaft 104, the effective length of the wrench 100 becomes shorter as projected onto the plane of the fastener turn. Therefore, the same steps used to compensate for the rotation angle, along with the algebraic equation for effective length of the wrench 100, can also be applied to compensate for the inaccuracies in torque readings. As a result, compensating torque and rotation angle readings on the wrench 100 with a flex head 106 when the wrench 100 is rotated while in a flexed position includes determining the tilt angle of the rotating torque wrench 100, compensating angle measurement error during rotation on multiple axes, and compensating torque measurement tilt error during rotation on multiple axes.

According to an embodiment of the present invention, calculating an amount of torque applied to a work piece (also referred to as adjusted or actual applied torque) provided by the wrench 100 may include determining a rotational angle of the wrench 100 (e.g., based on measured yaw (Z) and roll (X) axis rates), determining a tilt ($\theta$) of the wrench 100, measuring a torque of the wrench 100 (e.g., a wrench torque or measured amount of torque from the torque sensor). The amount of torque applied to the work piece may be determined based on the rotational angle, the tilt, and the measured amount of torque. The angle sensor 140 (e.g., a digital gyroscope) may measure angular rates of rotation over both the yaw axis and the roll axis simultaneously. The rotational angle may be determined by integrating the measured angular rates of rotation over time. The tilt may be determined using the measured angular rates of rotation. It should be appreciated that the determinations described herein may be performed in whole or in part by the processor/controller 122.

During operation, the wrench 100 (e.g., a tool) may include engaging a fastener with the head 106/drive 102 and applying a torqueing operation to the fastener. The sensors (e.g. angle sensor 140) measure angular rates of rotation over both a yaw axis and a roll axis simultaneously. A rotational angle of the wrench 100 is determined, for example by the processor/controller 122, using the angular rates of rotation output from the sensor(s). A tilt of the wrench 100 is determined, for example by the processor/controller 122, using the angular rates of rotation output by the sensor(s). The torque sensor 138 also measures a torque of the wrench 100. An actual fastener torque is determined, for example by the processor/controller 122, based on the rotational angle, the tilt, and the torque information output by the sensor(s).

An actual or adjusted torque applied by the wrench 100 may be determined, for example by the processor/controller 122, based on a measured torque from the torque sensor 138, and a tilt of the wrench 100. The measured torque is adjusted by an adjustment factor. The adjustment factor may be a ratio of a wrench length (e.g., a first distance or length A) to a reaction distance (e.g., second distance or length A') based on the determined tilt. For example, the reaction distance (e.g., A') is the distance from the reaction point 152 to the center 154 of drive 102 when the wrench 100 is tilted.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A method of measuring an amount of torque applied to a work piece by a tool having a head, comprising:
   determining an amount of rotational angle of the head;
   determining an amount of tilt of the head;
   measuring an amount of torque applied by the head to the work piece, thereby creating a measured amount of torque; and
   determining an adjusted amount of torque based on the rotational angle, the tilt, and the measured amount of torque.

2. The method of claim 1, wherein the step of determining the amount of rotational angle includes measuring the rotational angle using a gyroscope.

3. The method of claim 1, wherein the step of determining an amount of rotational angle includes measuring angular rates of rotation over both a yaw axis and a roll axis using a gyroscope.

4. The method of claim 3, wherein the step of determining an amount of rotational angle includes integrating the angular rates of rotation over a period of time.

5. The method of claim 3, wherein the step of determining an amount of tilt of the tool is based on the angular rates of rotation.

6. A tool adapted to apply torque to a work piece, comprising:
   a gyroscope adapted to measure angular rates of rotation over both a yaw axis and a roll axis;
   a torque sensor adapted to measure an amount of torque applied by the tool to the work piece, thereby creating a measured amount of torque; and
   a controller in communication with the gyroscope and torque sensor, wherein the controller is adapted to:
      receive the angular rates of rotation from the gyroscope;
      determine a rotational angle of the tool based on the angular rates of rotation;
      determine a tilt of the tool based on the angular rates of rotation;
      receive the measured amount of torque from the torque sensor; and
      determine an adjusted amount of torque applied by the tool to the work piece based on the rotational angle, the tilt, and the measured amount of torque.

7. The method of claim 6, wherein the tool further comprises a flex head.

8. The method of claim 7, wherein the gyroscope is disposed in the flex head.

9. A method of measuring an amount of torque applied to a work piece by a tool comprising:
   measuring, by a torque sensor, a measured amount of torque applied by the tool to the work piece;
   determining, by a controller, an amount of tilt of the tool; and
   adjusting, by the controller, the measured amount of torque by an adjustment factor, wherein the adjustment factor includes a ratio of a tool length to a reaction distance based on the amount of tilt.

10. The method of claim 9, further comprising determining a first tool length based on a first distance from a reaction point to a center of a drive when the tool is not tilted.

11. The method of claim 10, further comprising determining a second tool length based on a second distance from the reaction point to the center of the drive when the tool is tilted.

* * * * *